T. D. FRAZIER.
PNEUMATIC TIRE.
APPLICATION FILED JULY 24, 1919.
1,383,458. Patented July 5, 1921.
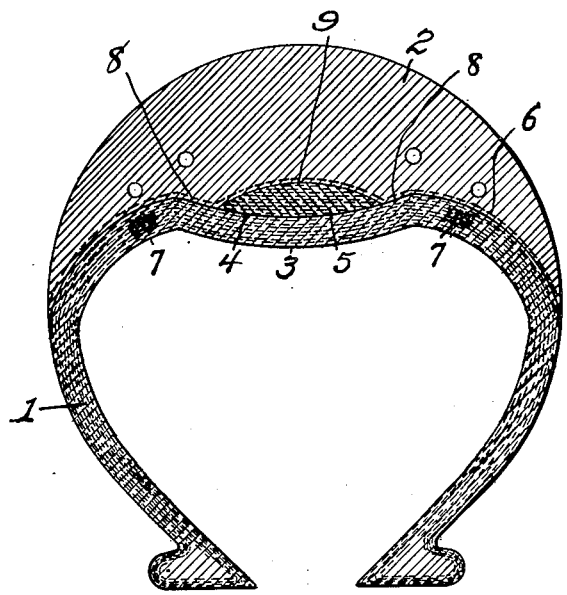
WITNESSES
INVENTOR
Truman D. Frazier
BY
ATTORNEY

UNITED STATES PATENT OFFICE.

TRUMAN D. FRAZIER, OF MARTINS FERRY, OHIO.

PNEUMATIC TIRE.

1,383,458. Specification of Letters Patent. Patented July 5, 1921.

Application filed July 24, 1919. Serial No. 312,885.

*To all whom it may concern:*

Be it known that I, TRUMAN D. FRAZIER, a citizen of the United States of America, and resident of Martins Ferry, county of Belmont, and State of Ohio, have invented certain new and useful Improvements in Pneumatic Tires, of which the following is a specification.

This invention relates broadly to pneumatic tires, and it has for its primary object to provide a tire structure having separable carcass and tread portions.

A further object is to provide a pneumatic tire embodying a carcass, or body portion, and a tread, or road contacting portion, which portions are capable of being separated, or detached one from the other, so that when the tread has become worn down to or near the carcass, it may be removed and a new tread substituted therefor.

With these and other objects in view, the invention resides in the features of construction which will hereinafter be explained, reference being had to the accompanying drawing, in which—

The figure is a transverse section of a tire constructed in accordance with my invention.

In said drawing, 1 indicates a tire body or carcass composed of a plurality of layers of fabric, cord, or fabric and rubber suitably combined, and 2 indicates a tread composed of rubber.

The carcass 1 is formed with its middle portion arcuately curved in an inward direction so that said portion presents a convex inner face 3 and a concave outer face 4. Conformably fitted in the external annular channel formed by curving the carcass as aforesaid is a pad 5 composed of a plurality of superposed layers of a suitable flexible material, preferably rubberized fabric, said pad being of such shape that it partially fills the concavity, so that it, conjointly with said carcass, presents an interrupted curved convex outer surface upon which is mounted the rubber tread 2. Said tread, which is of approximately crescent shape in cross section, has a rubberized fabric lining 6 on its inner surface adapted to be cemented or otherwise united to the carcass 1 and pad 5. In this connection it will be noted that the pad is smaller than the carcass channel, leaving lateral portions of the latter exposed. The conformably fitting tread, therefore, has convex portions 8 on opposite sides of the pad-receiving, concave channel 9, which convexities 8 seat in the lateral concavities of the carcass channel on opposites sides of the pad to securely and firmly interlock the parts together.

By having the pad 5 formed separate and distinct from the tread a puncture-proof and strain-resisting material differing from the tread may be employed and thereby a most durable tire structure may be obtained.

As shown, the opposite lateral edges of the tread extend down over the sides of the carcass a considerable distance, not only for the purpose of protecting the side walls of said carcass, but also to afford a maximum inner surface area disposed in adhering relation to said carcass.

A plurality of suitably disposed reinforcing strips 7 consisting of wire, fabric, or other suitable material may be employed in the body of the carcass, as shown.

When the tread has become worn down to or near the carcass, the same may be more or less readily stripped from the carcass, whereupon a new tread may be applied, the same being cemented, vulcanized, or otherwise suitably attached in fixed position.

What is claimed is—

A pneumatic tire composed of a relatively thick and unitary carcass having a channel formed circumferentially thereof in its tread portion, a pad in the channel partially filling the same, and a unitary separable tread having a concave inner face formed with a small channel conformably fitted to the pad and having lateral convex portions seated in the channel of the carcass on opposite sides of the pad.

In testimony whereof, I affix my signature in presence of two subscribing witnesses.

TRUMAN D. FRAZIER.

Witnesses:
   H. E. DUNLAP,
   A. L. DUNLAP.